United States Patent [19]

Rittner et al.

[11] Patent Number: 4,617,197
[45] Date of Patent: Oct. 14, 1986

[54] PROCESS FOR IMPROVING THE WETTING CHARACTERISTICS OF THE SURFACE OF SHAPED PLASTICS ARTICLES FOR APPLICATIONS IN CHEMICAL ENGINEERING

[75] Inventors: Siegbert Rittner, Mörfelden-Walldorf; Eugen Morach, Liederbach; Hubert Schindler, Eppstein; Peter John, Hofheim am Taunus, all of Fed. Rep. of Germany

[73] Assignee: Hoechst Aktiengesellschaft, Fed. Rep. of Germany

[21] Appl. No.: 738,087

[22] Filed: May 24, 1985

[30] Foreign Application Priority Data

May 28, 1984 [DE] Fed. Rep. of Germany ....... 3419856

[51] Int. Cl.⁴ .............................................. B05D 1/12
[52] U.S. Cl. .................................... 427/180; 427/198; 427/422; 427/423
[58] Field of Search ............... 427/180, 198, 223, 225, 427/316, 422, 423

[56] References Cited

U.S. PATENT DOCUMENTS

| | | |
|---|---|---|
| 2,173,484 | 9/1939 | Lerch et al. ..................... 427/225 X |
| 3,085,025 | 4/1963 | Eaton ............................... 427/198 X |
| 3,669,719 | 6/1972 | Doede et al. . | |

FOREIGN PATENT DOCUMENTS

| | | |
|---|---|---|
| 463176 | 2/1950 | Canada ............................... 427/180 |
| 0027625 | 10/1980 | European Pat. Off. . |
| 2102531 | 8/1972 | Fed. Rep. of Germany . |
| 2927983 | 1/1981 | Fed. Rep. of Germany . |
| 2935141 | 3/1981 | Fed. Rep. of Germany . |
| 3003045 | 7/1981 | Fed. Rep. of Germany . |
| 1197122 | 11/1959 | France . |
| 860648 | 2/1961 | United Kingdom . |
| 1079391 | 8/1967 | United Kingdom . |

OTHER PUBLICATIONS

DVS ("German Association for Welding Technology Report"), vol. 47, (1977), pp. 60-62-Cited and Discussed in the Specification herein at p. 2.
IBM Technical Disclosure Bulletin, vol. 19, No. 6, Nov. 6, 1979, pp. 2180-2181, IBM Corporation, New York, U.S.; E. P. Damm et al., "Production of Metal Surfaces on Plastic Parts", p. 2180, Technique 2.

Primary Examiner—Shrive P. Beck
Attorney, Agent, or Firm—Connolly and Hutz

[57] ABSTRACT

It is possible, by means of a flame-spraying or plasma-spraying technique adjusted to suit the particular properties of a plastic, not only to provide nonreinforced plastics with a uniform coating, but also to achieve an excellent hydrophilic surface wettability at the same time.

5 Claims, 6 Drawing Figures

FIG. 3
FIG. 4
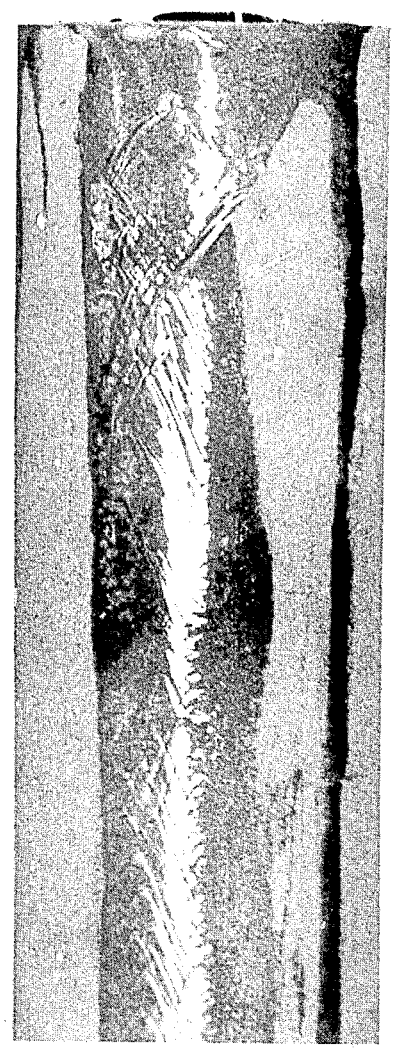

PROCESS FOR IMPROVING THE WETTING CHARACTERISTICS OF THE SURFACE OF SHAPED PLASTICS ARTICLES FOR APPLICATIONS IN CHEMICAL ENGINEERING

It is known that chemical engineering equipment and plants in which cooling and/or heating processes take place with the aid of a liquid medium have to be manufactured from materials possessing good wettability. In the case of many chemical engineering units, such as, for example, condensers, evaporators, heat exchangers, absorbers, crystallizers, reactors for chemical reactions and the like, which are in most cases manufactured from metallic materials or from glass or enamel, an excellent to satisfactory wettability in relation to aqueous systems is achieved. Hitherto, the use of plastics has been unsuccessful, largely owing to the non-uniform to poor wettability of this group of materials. In spite of having, in some cases, excellent corrosion properties and price advantages compared with other materials, plastics have hitherto not been found acceptable for special pieces of chemical engineering equipment in which heat exchange takes place via a falling film, such as, for example, wetted wall condensers, wetted wall heat exchangers, falling film evaporators, wetted wall absorbers or wetted wall crystallizers.

Attempts to achieve good wettability in relation to aqueous systems on plastics for chemical engineering applications by means of mechanical surface treatment, for example by electroplating or vapor-depositing metals in vacuo, have remained unsuccessful to unsatisfactory, since either only very thin layers have been achieved or the layers applied have not adhered adequately or it has only been possible to coat very small components. The metallization of plastics by heat-spraying has therefore remained restricted only to components composed of glass fiber-reinforced plastic or polyurethane foam for decorative purposes or against the build-up of electrostatic charge (cf. DVS ("German Association for Welding Technology Report"), Volume 47 (1977), pages 60–62).

A coating technique which is adapted to suit the particular properties of a plastic has now been found, which makes it possible to equip non-reinforced plastics not only with a uform coating, but also, at the same time, to achieve an excellent surface wettability.

The invention therefore relates to a process for improving the wetting characteristics of the surface of shaped plastics articles for chemical engineering applications by spraying a metal layer onto the surface, which comprises first heating the surface of the shaped plastics article by means of a heating flame to a temperature 10° to 150° C. above the softening point or crystallite melting point of the polymer, and then applying onto the surface a pulverulent, metallic or metal-depositing, spraying material having a particle size of 1 to 600 $\mu$m and a temperature of 20° to 700° C., under a pressure of 0.1 to 4.0 bar.

In the process according to the invention, the surface of the shaped plastics article is first heated by means of a flame-spraying gun or a plasma torch to a temperature 10° to 150° C. above the softening point or crystallite melting point of the polymer. In general, the surface is at a temperature of 130° to 350° C.

A pulverulent, metallic or metal-depositing, spraying material is then applied under a pressure of 0.1 to 4.0 bar, preferably 0.2 to 1.0 bar, and at a temperature of 20° to 700° C., preferably 20° to 100° C. The application of the spraying material is usually performed by means of a gas-stream. Only at high temperatures a burner is used. Suitable spraying materials are powdered metals and metal alloys, powdered metal carbides and metal oxides. These powders can be used individually and as a mixture, and it is also possible to use coated powders. The spraying material has a particle size of 1 to 600 $\mu$m, preferably 2 to 400 $\mu$m and particularly 5 to 200 $\mu$m. The amount of spraying material is such that the surface of the shaped plastics article is substantially, but not completely, covered. If it is completely covered, there is a risk that the coating can tear, depending on the extent of the temperature difference, because of the difference in the thermal expansion of the plastic and the coating.

The process according to the invention makes it possible to coat all the plastics customary in the construction of equipment, for example high-density polythene, polypropylene, polyvinyl chloride, polyvinylidene fluoride and polytetrafluoroethylene.

It is preferable to coat polypropylene and polytetrafluoroethylene.

Whereas when the conventional flame-spraying or plasma-spraying process is used the pulverulent sprayed additives which are fused in the heating flame and applied to the surface of the plastics do not adhere thereto, the two-stage process according to the invention makes it possible to produce a firmly adhering metal layer on the plastic. The two-stage coating technique according to the invention enables the plastic polypropylene, which is at present of particular interest and which has hitherto been considered uncoatable, to be provided with an improved surface composed of a firmly adhering metal layer, and it thus becomes excellently wettable at the same time.

It is also a particular advantage in the process according to the invention that no additional added binders such as, for example, plastics powders, have to be used for the spraying material. Nor is any effect caused to gas-sensitive metals, such as, for example, titanium, as the result of excessive heating. This has the effect that the sprayed coating is well matched to the particular corrosion conditions, which means a low-cost method of application, particularly for coating large components for chemical engineering equipment.

The process according to the invention is of great importance in the construction of equipment for chemical engineering, since various pieces of equipment composed, because of corrosive reaction media, of metals which are expensive and in some cases difficult to fabricate, can now be replaced by cheaper, corrosion-resistant shaped plastics articles or can be made entirely of the latter.

The examples and figures below are intended to illustrate the process according to the invention in greater detail.

FIGS. 3 to 6 show plastics tubes during the testing of wettability.

Figure 1:
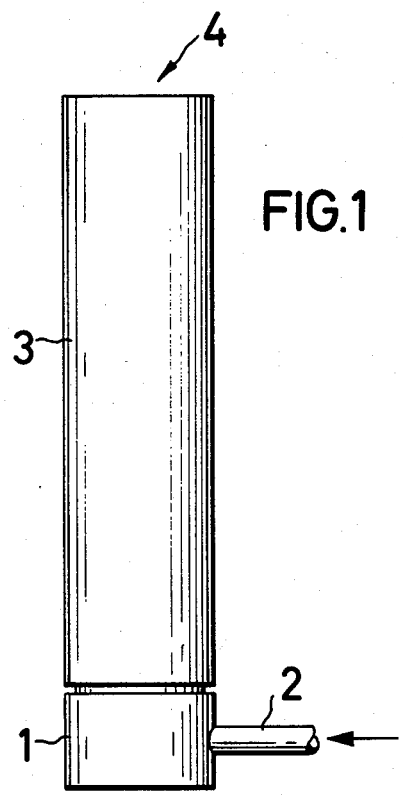
FIG. 1 shows the equipment for testing wettability.

A can (1) open at the top and having an inlet (2) at the side was used for testing wettability in accordance with FIG. 1. A plastics tube (3) was placed on top of the can (1). Water was passed in through the inlet (2), and rose within the tube (3) and ran over the edge at the upper end (4). Depending on the wettability of the outer surface of the tube, the descending water formed a rivulet or a more or less continuous film.

The wetting characteristics were monitored in accordance with the following scale of assessment:

| Designation | Wetting characteristics |
|---|---|
| +++ | very good |
| ++(+) | good |
| ++(−) | adequate |
| −−(−) | deficient (rivulet formation) |

EXAMPLE 1

A tube made of polypropylene (density 0.902 g/cm$^3$, MFI 230/5 1.2 g/10 minutes) of dimension 90 mm external diameter×9 mm wall thickness×800 mm length was slightly incipiently melted (temperatue approx. 200° C.) uniformly at the surface of the plastic by means of a flame-spraying gun. In a second process stage, a Cr/Ni powder having an average particle size of 45 to 120 μm was then applied continuously onto the surface of the tube by means of an air stream at room temperature and at a pressure of approx. 0.3 bar. Subsequent metallographic cross-sectional specimens and bending tests confirmed that there was good adhesion to the plastics tube.

Figure 2:
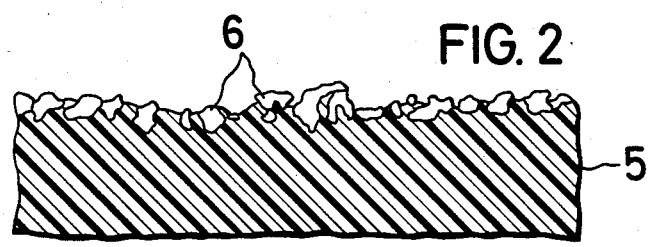
FIG. 2 shows a vertical section through the wall of a shaped plastic article.

FIG. 2 shows a cross-sectional specimen of this type, in which the wall (5) of the plastics tube (3) and the metal particles (6) partially embedded therein can be seen. The figure also shows that the metal particles (6) do not completely cover the surface of the plastics tube (3). The results of wettability testing are shown in the table.

EXAMPLE 2

The same polypropylene tube as in Example 1 was coated analogously to Example 1 with a pulverulent spray additive Ni 99.3 as specified in DIN 32,529 having a particle size range of 5.6 to 45 μm (cf. the table).

EXAMPLE 3

A tube of high-density polyethylene (density 0.953 g/cm$^3$, MFI 190/5 0.5 g/10 minutes) having the dimensions 91 mm external diameter×8.5 mm wall thickness was coated analogously to Example 1 with a pulverulent spray additive AL 99 as specified in DIN 32,529 having a particle size of 45–70 μm (cf. the table).

EXAMPLE 4

A polytetrafluoroethylene rod having a diameter of 40 mm was coated analogously to Example 1 with a pulverulent spray additive CrNi-steel 316 L having a particle size of 45 to 120 μm (cf. the table).

COMPARISON EXAMPLE

The coating of polypropylene tubes as used in Example 1 by the conventional plasma-spraying process—adding the CrNi spray additive directly to the heating flame—did not succeed, since the spraying material merely rebounded off the surface of the plastics tube (cf. the table).

TABLE
Results of wettability testing

| Example No. | Plastic | Spraying material Material | Part. size | Assessment of wettability@ |
|---|---|---|---|---|
| 1 | polyproplene | CrNi—steel | 45–120 μm | +++ |
| 2 | polypropylene | Ni 99.3 | 5.6–45 μm | ++(+) |
| 3 | HD-polyethylene | Al 99 | 45–70 μm | ++(+) |
| 4 | polytetrafluoroethylene | CrNi—steel | 45–120 μm | ++(+) |
| Com. ex. | polypropylene polypropylene | CrNi—steel uncoated | 45–120 μm | −−(−) −−(−) |

Figure 5:
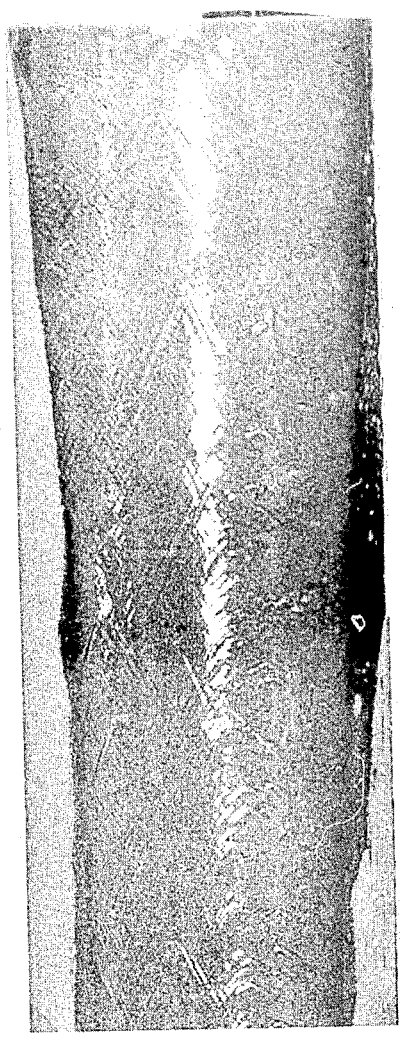
Figure 6:
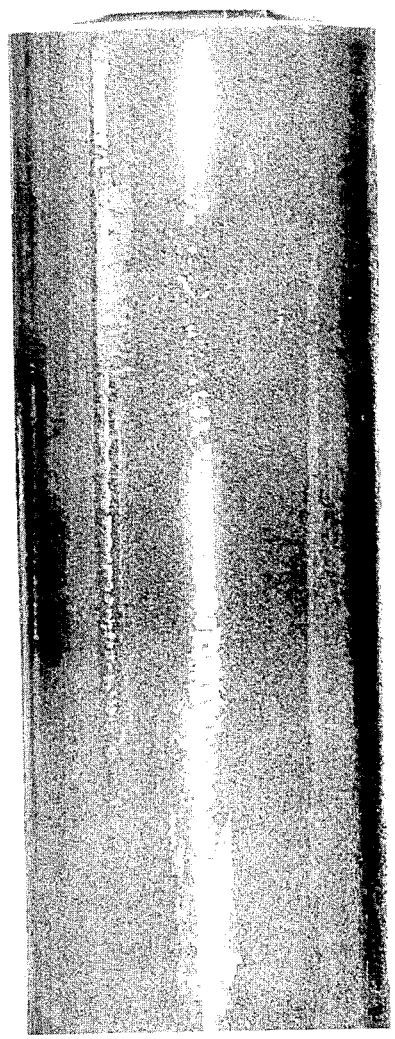

The poor wettability of an uncoated polypropylene tube is demonstrated in FIG. 3. The water runs down in rivulets on the wall of the tube. FIGS. 4, 5 and 6 show the good wettability of the coated polypropylene tube according to Example 1. FIG. 4 shows the start of the water overflow, FIG. 5 shows the progressive wetting of the surface of the tube and, in FIG. 6, the water forms a uniform film.

We claim:

1. A process for improving the wetting characteristics of the surface of shaped plastics articles for chemical engineering applications by the application of a metal layer to the surface, which comprises first heating the surface of the shaped plastics article by means of a heating flame to a temperature 10° to 150° C. above the softening point of crystallite melting point of the polymer, and then applying onto the surface a pulverulent, metallic, spraying material having at a particle size of 1 to 600 μm and a temperature of 20° to 700° C. under a pressure of 0.1 to 4.0 bar.

2. The process as claimed in claim 1, wherein pure metals, metal alloys, metal oxides, metal carbides, powder mixtures or coated powders are used as the spraying material.

3. The process as claimed in claim 1, wherein the spraying material is deposited on the surface of tubes.

4. The process as claimed in claim 1, wherein Cr/Ni powders are used.

5. The process as claimed in claim 1, wherein polypropylene tubes are coated.

* * * * *